United States Patent
Mondragon et al.

(10) Patent No.: US 8,928,585 B2
(45) Date of Patent: Jan. 6, 2015

(54) EYE TRACKING CONTROL OF VEHICLE ENTERTAINMENT SYSTEMS

(75) Inventors: Christopher K. Mondragon, Laguna Niguel, CA (US); Brett Bleacher, Rancho Santa Margarita, CA (US)

(73) Assignee: Thales Avionics, Inc., Irvine, CA (US)

( * ) Notice: Subject to any disclaimer, the term of this patent is extended or adjusted under 35 U.S.C. 154(b) by 118 days.

(21) Appl. No.: 13/605,176

(22) Filed: Sep. 6, 2012

(65) Prior Publication Data

US 2013/0063340 A1 Mar. 14, 2013

Related U.S. Application Data

(60) Provisional application No. 61/532,875, filed on Sep. 9, 2011.

(51) Int. Cl.
*G09G 5/00* (2006.01)

(52) U.S. Cl.
CPC ........................................ *G09G 5/00* (2013.01)
USPC .......................................................... 345/156

(58) Field of Classification Search
None
See application file for complete search history.

(56) References Cited

U.S. PATENT DOCUMENTS

| | | | |
|---|---|---|---|
| 5,594,469 A | 1/1997 | Freeman et al. | |
| 5,701,058 A | 12/1997 | Roth | |
| 6,002,808 A | 12/1999 | Freeman | |
| 6,152,563 A | 11/2000 | Hutchinson et al. | |
| 6,373,961 B1 | 4/2002 | Richardson et al. | |
| 7,058,204 B2 | 6/2006 | Hildreth et al. | |
| 7,176,899 B2 | 2/2007 | Nagasaka et al. | |
| 2005/0046755 A1 | 3/2005 | Hattori et al. | |
| 2006/0050014 A1 | 3/2006 | Yoon | |
| 2007/0195997 A1 | 8/2007 | Paul et al. | |
| 2007/0268246 A1 | 11/2007 | Hyatt | |
| 2008/0129707 A1 | 6/2008 | Pryor | |
| 2008/0136839 A1 | 6/2008 | Franko et al. | |
| 2009/0102788 A1 | 4/2009 | Nishida et al. | |
| 2009/0109036 A1 | 4/2009 | Schalla et al. | |
| 2009/0278915 A1 | 11/2009 | Kramer et al. | |
| 2010/0208206 A1 | 8/2010 | Connell, II | |
| 2011/0050589 A1 | 3/2011 | Yan et al. | |
| 2011/0068227 A1 | 3/2011 | Kneller et al. | |
| 2011/0080490 A1 | 4/2011 | Clarkson et al. | |
| 2011/0099588 A1 | 4/2011 | Ashton | |

(Continued)

FOREIGN PATENT DOCUMENTS

WO   WO 2004/045399 A1   6/2004
WO   WO 2010/141403 A1   12/2010

OTHER PUBLICATIONS

International Search Report Corresponding to International Application No. PCT/US2012/053954; Date of Mailing: Dec. 10, 2012; 12 Pages.

(Continued)

*Primary Examiner* — Nicholas Lee

(74) *Attorney, Agent, or Firm* — Myers Bigel Sibley & Sajovec, P.A.

(57) ABSTRACT

An in-flight entertainment system includes a video display unit facing a user seat. The video display unit includes a display surface that displays images to a user who is seated on the user seat. A light emitter illuminates eyes of the user. A camera outputs a video signal containing reflections from the illuminated eyes. A processor processes the video signal to determine a viewing location on the display surface at which the eyes are directed, and controls at least one function for how images are displayed on the display surface responsive to the determined viewing location.

18 Claims, 10 Drawing Sheets

(56) References Cited

U.S. PATENT DOCUMENTS

2011/0123183 A1 5/2011 Adelsberger et al.
2011/0148930 A1 6/2011 Lee et al.
2011/0274405 A1 11/2011 Godar

OTHER PUBLICATIONS

International Search Report Corresponding to International Application No. PCT/US12/53934; Date of Mailing: Nov. 19, 2012; 11 Pages.
International Preliminary Report on Patentability, Application No. PCT/US2012/053954; Dec. 5, 2013.

EYE TRACKING CONTROL OF VEHICLE ENTERTAINMENT SYSTEMS

CROSS REFERENCE TO RELATED APPLICATION

This application claims the benefit of U.S. Provisional Application No. 61/532,875, filed Sep. 9, 2011, the entire content of which is incorporated herein by reference.

TECHNICAL FIELD

Embodiments described herein relate generally to electronic entertainment systems and, more particularly, to man-machine interfaces for controlling entertainment systems.

BACKGROUND

The approaches described in this section could be pursued, but are not necessarily approaches that have been previously conceived or pursued. Therefore, unless otherwise indicated herein, these approaches are not known to be prior art and are not admitted to be prior art by inclusion in this section.

Automated gesture recognition has been the subject of considerable study since 1995. One objective of gesture recognition was control of machines, as described in U.S. Pat. No. 5,594,469 to Freeman et al., entitled "Hand Gesture Machine Control System." The approach used by Freeman et al. was to have a hand gesture in space cause movement of an on-screen displayed hand icon over an on-screen displayed machine control icon. The hand icon moved the machine control icon to effectuate machine control.

In U.S. Pat. No. 6,002,808 to Freeman, entitled "Hand Gesture Control System," hand gestures are sensed optically through use of a camera, and converted into a digital representation based on horizontal and vertical position of the hand, length and width of the hand, and orientation of the hand.

In U.S. Pat. No. 7,058,204 to Hildreth et al., entitled "Multiple Camera Control System," a multi-camera technology is described, whereby a person can control a screen by pointing a finger.

More recent studies have included controlling a man-machine interface by tracking where a user is viewing a display device. For example, U.S. Pat. No. 6,373,961 to Richardson et al., entitled "Eye Controllable Screen Pointer," discloses a system that tracks eye movements to control a screen pointer.

Gesture and eye based control of man-machine interfaces has many advantages over various physical interfaces, such as a touch screen displays, switches, mouse devices, keypads, and keyboards for controlling electronic systems. Physical interfaces need to be positioned within the convenient reach of a person. When physical interfaces are intended for use in a public setting, problems can arise in that the physical interface surfaces may become unsanitary or unattractive to users. Moreover, physical interface surfaces are subject to wear, which can diminish their useful life and increase maintenance costs. Furthermore, there is the potential for abuse and damage from vandalism to physical interfaces.

SUMMARY

Some embodiments of the present disclosure are directed to a video display unit that includes a display surface, a light emitter, a camera, and a processor. The display surface displays images to a user. The light emitter is configured to illuminate eyes of the user while seated in front of the video display unit. The camera is configured to output a video signal containing reflections from the illuminated eyes. The processor is configured to process the video signal to determine a viewing location on the display surface at which the eyes are directed, and to control at least one function for how images are displayed on the display surface responsive to the determined viewing location.

In some further embodiments, the processor detects a location of the user's face relative to the camera, and controls the camera angle actuator to rotate the camera toward the user's face. A user can select a displayed indicia by looking at it for at least a threshold selection dwell time and/or by blinking for at least a threshold blink time after looking at the indicia. The size of displayed user selectable indicia can be controlled responsive to a determined accuracy of the user's attempted selections, a detected angle of recline of a seat back surface on which the user rests, a detected distance to the user's eyes, and/or a vibration signal indicating the video display unit is being subjected to vibration. A plurality of the light emitters may be spaced apart and arranged as arrays along various sides of the display surface, and can be sequentially pulsed so that the processor can determine the viewing location on the display surface responsive to which of the light emitters in the arrays create the brightest eye reflections.

Some other embodiments are directed to an in-flight entertainment system that includes a video, display unit facing a user seat. The term "in-flight" is defined to include the meaning "in-operation" when an aircraft is on the ground. The video display unit includes a display surface that displays images to a user who is seated on the user seat. A light emitter illuminates eyes of the user. A camera outputs a video signal containing reflections from the illuminated eyes. A processor processes the video signal to determine a viewing location on the display surface at which the eyes are directed, and controls at least one function for how images are displayed on the display surface responsive to the determined viewing location.

Other video display units, in-flight entertainment systems, and methods according to embodiments of the invention will be or become apparent to one with skill in the art upon review of the following drawings and detailed description. It is intended that all such additional video display units, in-flight entertainment systems, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Various embodiments of the present invention may arise from the present realization that In-Flight Entertainment (IFE) systems can be difficult to control using touch-screen interfaces that are part of a seatback video display unit. When touch-screen interfaces are placed in seatbacks of premium and business class seating, the touch-screen interfaces can be located too far away from the facing users to be conveniently reached. Moreover, touch-screen interfaces in seatbacks of coach class seating can be difficult to reach when the users' seats are reclined.

To overcome these and other problems, various embodiments of the present invention are directed to providing a Smart Video Display Unit (SVDU) that is configured to be controlled by tracking the eyes of a user (e.g., user) who is seated in close proximity to the SVDU. The SVDU may be further configured to control other defined components/systems (e.g., controlling overhead lighting and/or calling a flight attendant in an aircraft) responsive to selections that are determined by tracking the user's eyes.

Figure 1:
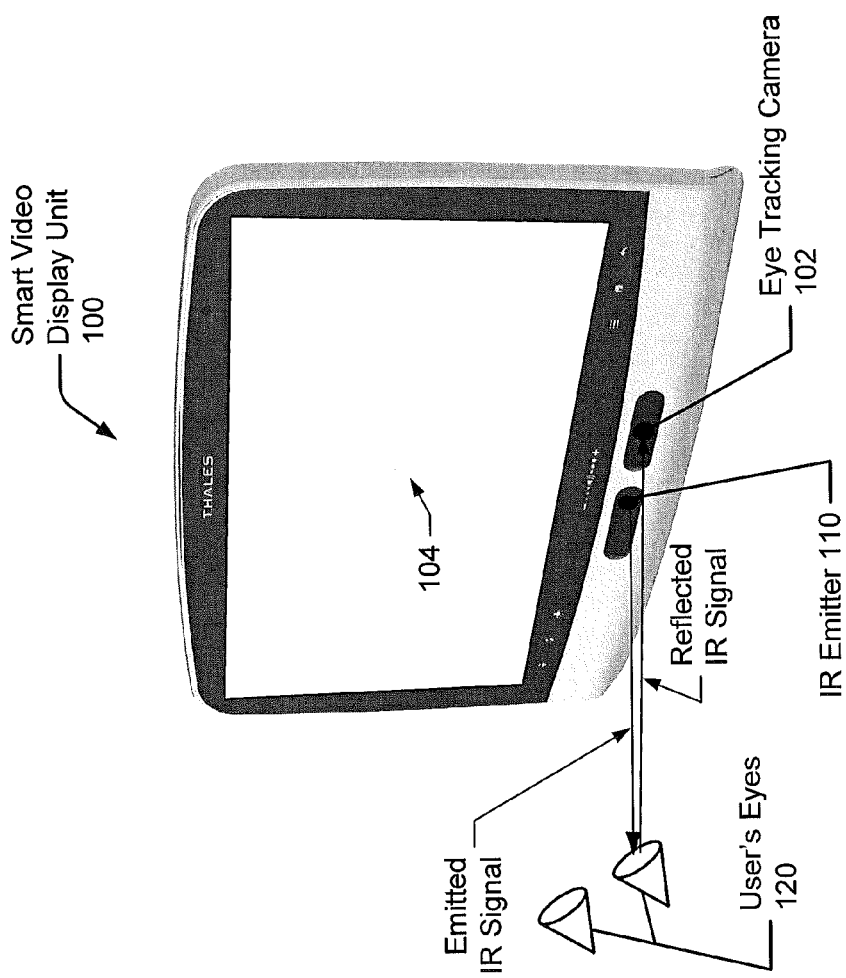
FIG. 1 illustrates a smart video display unit that has an eye control man-machine interface configured according to some embodiments.

FIG. 1 illustrates a SVDU 100 that has a display surface 104 that is configured to display images to a user, and further displays user selectable indicia that a user can select to control at least one function for how the images are displayed and/or to control other defined components/systems. The SVDU 100 has an eye tracking interface that can determine a viewing location on the display surface 104 at which a user's eyes are directed, and can identify a user's selection among the user selectable indicia responsive to the determined viewing location.

The eye tracking interface includes at least one eye tracking camera 102 and at least one light emitter 110. The light emitter 110 is configured to illuminate the eyes 120 of a user who is seated facing the SVDU 100.

In some embodiments, the light emitter 110 can be an infrared (IR) light emitter which can provide advantages over a visible light emitter, including: 1) can be directed toward a person's eyes without annoyance; 2) can be used without disturbing a darkened vehicle environment; 3) provides high reflectivity from pupils of eyes; 4) more easily distinguished from other ambient lighting sources in a vehicle environment; and 5) the IR emitter can be increased in intensity to compensate for bright generated light or sunlight within the cabin interior.

The emitted brightness of the light emitter 110 may be controlled (e.g., by the processor 200) to increase in response to sensing higher levels of background brightness (e.g., sensed via the video signal from the camera(s) 102), and to decrease in response to sensing lower levels of background brightness. Thus, for example, while a user's face is brightly lit by sunlight (as sensed via the video signal), the light emitter 110 can be controlled to output a brighter (higher illumination output) light toward the user's face to compensate for the effects on sunlight (e.g., washed out eye's relative to the face within the video signal) and, thereby, enable accurate tracking of the user's eyes.

The emitted IR light is reflect by the person's eyes (e.g., reflected by the cornea and lens) and returned to the eye tracking camera 102. The eye tracking camera 102 and associated circuitry can identify a location on the display surface 104 that is being viewed by the person, and can identify when one of the displayed indicia (e.g., displayed button, icon, text, menu item, etc.) is being looked at by the user in a way that satisfies a defined condition for selection of that indicia. A user's selection of different ones of the indicia causes the SVDU 100 to perform a corresponding different function controlling how images are displayed on the display surface 104 and/or controlling other defined components/systems within an aircraft or another vehicle.

Although embodiments herein are primarily described in the context of an In-Flight Entertainment (IFE) system within an aircraft user cabin, the invention is not limited thereto. Instead, embodiments may be used to provide other types of entertainment systems for trains, automobiles, homes, cruise ships, buses, military transport airacraft, or other environments. Moreover, although some embodiments are described as using a single camera 102, the invention is not limited thereto and may be used with any number of cameras.

Figure 2:
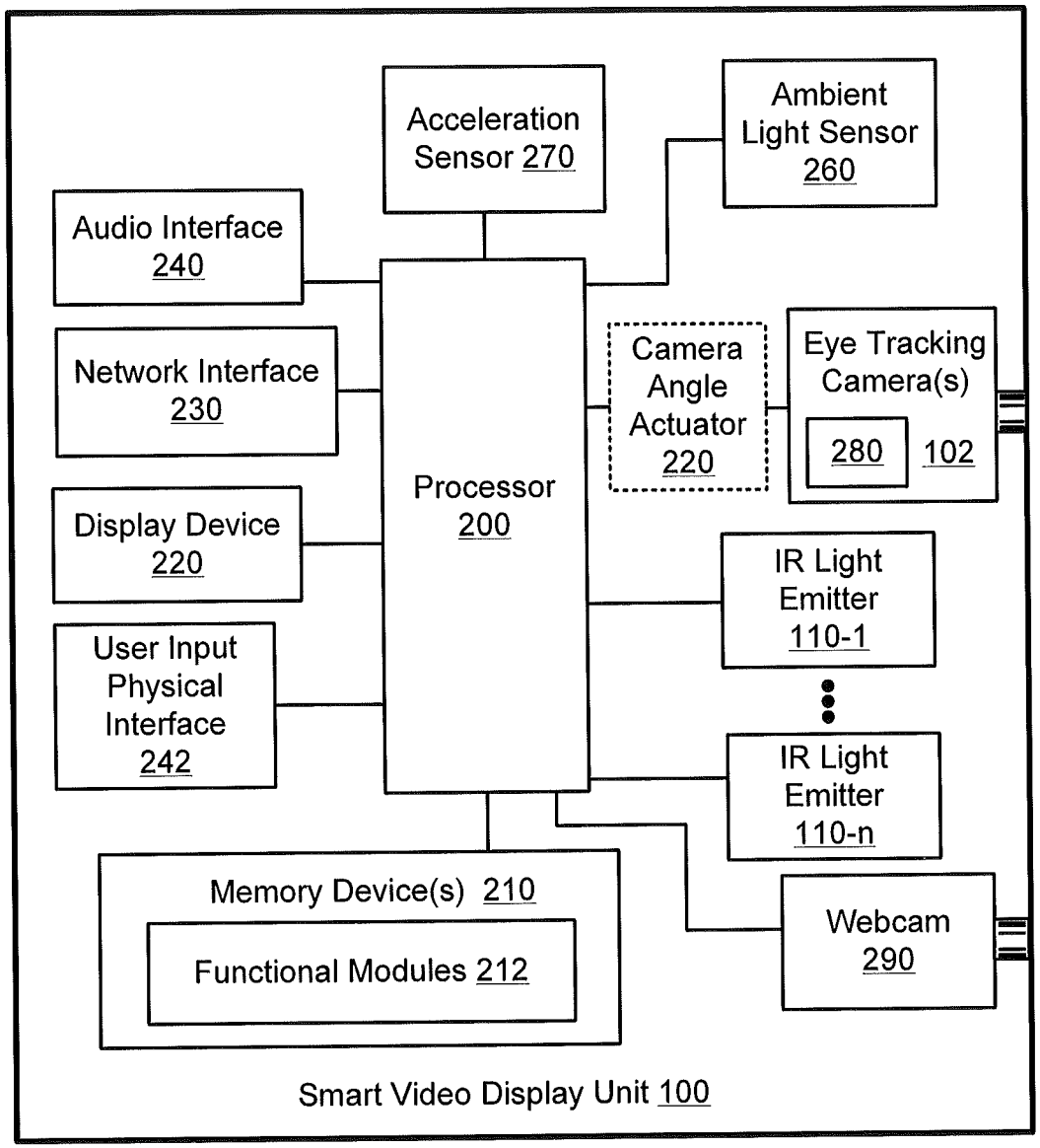
FIG. 2 is a block diagram of components that may be included in the smart video display unit of FIG. 1 and configured to operate according to some embodiments.

Block Diagram of Example SVDU:

FIG. 2 is a block diagram of example components that may be included in a SVDU, such as the SVDU 100 of FIG. 1 according to some embodiments. Referring to FIG. 2, the SVDU 100 includes a processor 200, memory device(s) 210 that contain functional modules 212, the eye tracking camera(s) 102, a display device 220 containing the display surface 104 (e.g., a liquid crystal display which may include a touch-sensitive interface), an audio interface 240, and/or a wired or wireless network interface 230. The SVDU 100 may further include a physical interface 242 (e.g., switches, control wheels, buttons, keypad, keyboard, etc.) that can be manipulated by a user to control the SVDU 100 and other defined components/systems within the aircraft.

The processor 200 includes one or more data processing circuits, such as a general purpose and/or special purpose processor (e.g., microprocessor and/or digital signal processor). The processor 200 is configured to execute computer program instructions from the functional modules 212 in the memory device(s) 210, described below as a computer readable medium, to perform some or all of the operations and methods that are described herein for one or more of the embodiments.

The processor 200 may receive music, video, games, data, and application programs through the network interface 230, which it processes for display on the display device 220 and/or for output as audio through the audio interface 240 to, for example, a headphone jack attached to an armrest of the seat. The music, video, games, data, and application programs may be received from a network connected media server that is configured to respond to on-demand requests generated by the user through selection of displayed indicia, which can be identified by the processor 200 tracking the user's viewing location.

The memory 210 may contain a library of user selectable indicia and associated functional commands. A user's selection of different ones of the user selectable indicia causes the processor 200 to perform a corresponding different function to control how images are displayed on the display surface 104.

As explained above, the one or more light emitters 110-1 to 110-n illuminate eyes of the user who is seated in front of the SVDU 100. The eye tracking camera 102 outputs a video signal containing reflections it senses from the illuminated eyes. The processor 200 processes the video signal to determine a location on the display surface 104 at which the eyes are directed. The processor 200 may determine the viewed location by tracking incident angles of the light received by the camera 102 from reflections off the eyes. More particularly, the processor 200 may perform a calibration process to determine baseline incident angles as the user views target indicia that are displayed at known locations on the display surface 104, and generate a functional relationship between the detected angles and the viewed locations on the display surface 104. The processor 200 can then track the incident angles as the user views other locations on the display surface 104 and use the generated functional relationship to determine (e.g., extrapolate from the calibrated angles and locations) the corresponding viewed locations.

The processor 200 can also identify when a user intends to select a defined location, such as one of a plurality of displayed indicia (e.g., displayed buttons, icons, words, text strings, etc.), by determining when the location is being looked at by the user in a way that satisfies a defined condition for selection.

Although the eye tracking camera 102 is illustrated in FIG. 2 as being within the SVDU 100, it may instead be communicatively connected to, but separately packaged from, the smart video display unit 100. A separately packaged eye tracking camera 102 may include an internal co-processor 280 that is configured to pre-analyze the video signal to, for example, identify objects within the video signal to generate object location information that can be used by the main processor 300 to track direction and/or movement of a user's eyes and control functionality of the SVDU 100 and/or other defined systems within the vehicle. The co-processor 280 may additionally be configured to track direction and/or movement of a user's eyes within the video signal to generate eye tracking information that can be used by the main processor 200 to control functionality of the SVDU 100 and/or other defined systems within the vehicle. The co-processor 400 may therefore perform one or more of the operations illustrated in one or more of FIGS. 3-15, to offload at least some of the eye tracking processing burden from the main processor 200.

The SVDU 100 The camera(s) 102 may include another camera 290 that is configured to provide webcam communications, such as for video conferencing between users seated in the same aircraft and/or from a user's SVDU 100 to another communication device outside the aircraft/vehicle through an off-vehicle communication link (e.g., network communication link between an aircraft and ground/satellite transceiver stations). The camera 290 may be a conventional RGB webcam, and may be incorporated into one or more of the eye tracking camera(s) 102.

Selection of Functionality Responsive to Tracking of User's Eyes:

The processor 200 can be programmed to determine when a user is looking at the display surface 104 in one or more ways that satisfy various defined conditions for the selection of defined functionality.

For example, the processor 200 can detect that the user has selected a first one of a plurality of user selectable indicia that are displayed on the display surface 104, by determining that the viewing location corresponds to a location of the first user selectable indicia for at least a threshold selection dwell time. Thus, a user can select the first indicia by staring at the first indicia for at least the threshold selection dwell time. The processor 200 responds to the selection by performing the function that is associated with the first indicia.

The processor 200 may alternatively or additionally detect that the user has selected the first one of the user selectable indicia in response to determining, from processing of the video signal, that the user's eyes were viewing the first indicia and then remained closed while blinking for at least a threshold blink time. Thus, a user can select the first indicia by looking at the first indicia and then closing the eyes for the threshold blink time. The processor 200 responds to the selection by performing the function that is associated with the first indicia.

The processor 200 may combine the functionality of staring and blinking as selection conditions, so that a user can select the first indicia by staring at the first indicia for at least the threshold selection dwell time and then closing the eyes for the threshold blink time.

The processor 200 may perform other operations to determine when a user is looking at a displayed indicia or other defined area of the display surface 104 to indicate selection of a desired function that is to be performed to control the SVDU 100 and/or other defined components/systems.

Various functionality of the SVDU 100 and/or other defined components/systems that a user can control by movement of the user's eyes can include, but is not limited to:
  1) selecting among displayed menu items;
  2) selecting among displayed movies or other media programs;
  3) selecting among applications;
  4) controlling audio volume;
  5) controlling playing, pausing, fast forward/rewind of a selected movie or other media;
  6) controlling a game or other application being executed by the SVDU 100;
  7) controlling seat actuator functions (e.g., seat recline angle, massage actuators, foot rest position, etc.);
  8) controlling window shade positioning (e.g., open/close shade);
  9) control overhead lighting for the seat;
  10) control user service functions; and/or
  11) trigger communication of requests/responses to flight attendants.

In some embodiments, a user may scroll in a defined direction through a list of displayed menu items by moving the eyes in a corresponding direction relative to the display surface 104 of the SVDU 100. The user may select a particular one of the displayed menu items by staring at the particular menu item for a threshold selection dwell time and/or by maintaining the eyes closed after viewing the location of the particular menu item for at least a threshold blink time.

The processor 200 may move a cursor displayed on the display surface 104 that track locations where the eyes are determined to be looking, and may select an indicia displayed on the display 104 when the eyes dwells on the indicia for a threshold selection dwell time, when the eyes remained closed for at least a threshold blink time after viewing the location of the indicia, when the eyes blink faster than a threshold blink rate after viewing the location of the indicia, and/or when the eyes are moved in a defined gesture pattern after viewing the location of the indicia (e.g., moving the eyes to draw a check mark that traverses a location of the indicia or moving the eyes to draw a circle that encloses a location of the indicia). The user may thereby steer the cursor to the desired indicia by moving the eyes, and then select the desired indicia by dwelling on it for the threshold selection dwell time, closing the eyes for the threshold blink time, blinking more rapidly than the threshold blink rate, and/or drawing a gesture pattern on or relative to the indicia.

In some other embodiments, the processor 200 is configured to identify a level of activity or alertness of a user by observing movement of the user's eyes and/or how long the eyes remain closed. The processor 200 may, for example, determine when a user has maintained eyes closed and/or relatively motionless for a threshold time. Alternatively or additionally, the processor may determine when the eyes are looking at locations that are outside (not on) the display surface 104. In response to that determination, the processor 200 can carry-out sleep operations that are appropriate when the user is sleeping, resting, or looking elsewhere for a sufficient time to indicate that the user is not presently interested in using the SVDU 100. The triggered sleep operations may include turning-off/dimming backlighting for the display device 220 (which can extend the life of the display device 220), turning off/dimming overhead lighting for the seat, closing an adjacent window shade, pausing playback of a movie or other media that is being delivered on-demand to the user and played on the display surface 104, muting an audio output through the audio interface 140, and/or notifying a flight attendant that the user is sleeping (e.g., sending a sleep/resting status message through the network interface 230 to a flight attendant terminal). Which of the one or more sleep operations is triggered can be determined based on whether the user appears to be asleep versus not looking at the SVDU 100.

The processor 200 may similarly determine when the user has awoke and/or when the user is not longer looking away from the display surface 104 but instead is looking at the display surface 104 for a sufficient time to indicate that the user desires to use the SVDU 100, and can responsively carry-out wake-up operations. The triggered wake-up operations may include turning-on/brightening backlighting for the display device 220, turning on/brightening overhead lighting for the seat (when the overhead lighting was on before the sleep operations), opening an adjacent window shade (when the window shade was open before the sleep operations), resuming playback of a movie or other media from the previously paused location, ceasing muting of an audio output, notifying a flight attendant that the user is awake/alert (e.g., sending am awake/alert status message to a flight attendant terminal).

The processor 200 may display a prompt to the user seated on a user seat within an aircraft to turn-off overhead lighting and/or to close a side window blind responsive to the processor 200 detecting more than a threshold level of lighting in the video signal which interferes with the determination of the viewing location on the display surface.

Automatically Steering Camera Toward Eyes:

The ability of camera 102 to determine the direction that the eyes are looking and the accuracy with which it can make this determination depends upon how well the camera 102 can view the eyes. The camera 102 may have its greatest accuracy at tracking direction of the eyes when a centerline of its field of view is nearly perpendicular to a primary plane of the cornea. However, significant height variations can occur between users (e.g., tall adults versus young children) with corresponding differences in the relative positioning between the camera 102 and the eyes. Moreover, in aircraft and some other vehicle applications, the user's seat may recline which can result in variation in the location and angle of the eyes depending upon the tilt angle of a seat back surface on which the user rests.

Although the SVDU 100 of FIG. 1 illustrates a single camera 102 located below the display surface 104 and viewing through an opening along a bottom-center portion of the housing, the camera 102 may be located elsewhere such as along a top-center portion of the housing. Moreover, a plurality of cameras 102 may be spaced apart around the display surface 104 as explained further below. A single wide viewing angle camera may be used to view a wider area in which the user's face and eyes can be located. The singe wide viewing angle camera may avoid the need for inclusion of the angle actuator 220 in the system.

The SVDU 100 may include a camera angle actuator 220 that is configured to operate to steer the camera 102 toward a user's face, and which can controlled to compensate for height differences between users and/or different reclining angles of a user's seat. The camera angle actuator 220 can be connected to the camera 102 and rotate a viewing angle of the camera 102 relative to the display surface 104.

Figure 3:
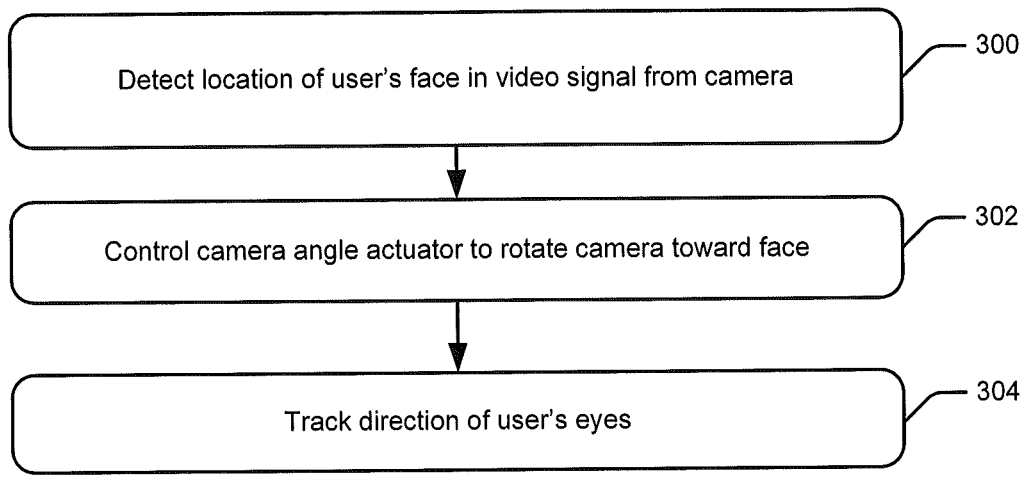
FIGS. 3 and 4 are flowcharts of operations and methods that may be performed by a processor circuit of the smart video display unit to control a camera angle actuator to rotate the camera toward a user's face according to some embodiments.

FIG. 3 is a flowchart of operations and methods that the SVDU 100 may perform to steer the camera 102 toward a user's face. The processor 200 can be configured to process the video signal from the camera 102 to detect (block 300) a location of the user's face (e.g., or user's eyes) relative to the camera 102, and to control (block 302) the camera angle actuator 220 to rotate the camera 102 toward the user's face and, more particularly, toward the user's eyes. The processor 200 can then further track (block 304) the direction of the user's eyes more accurately because the camera 102 is angled to better view the eyes.

Figure 4:
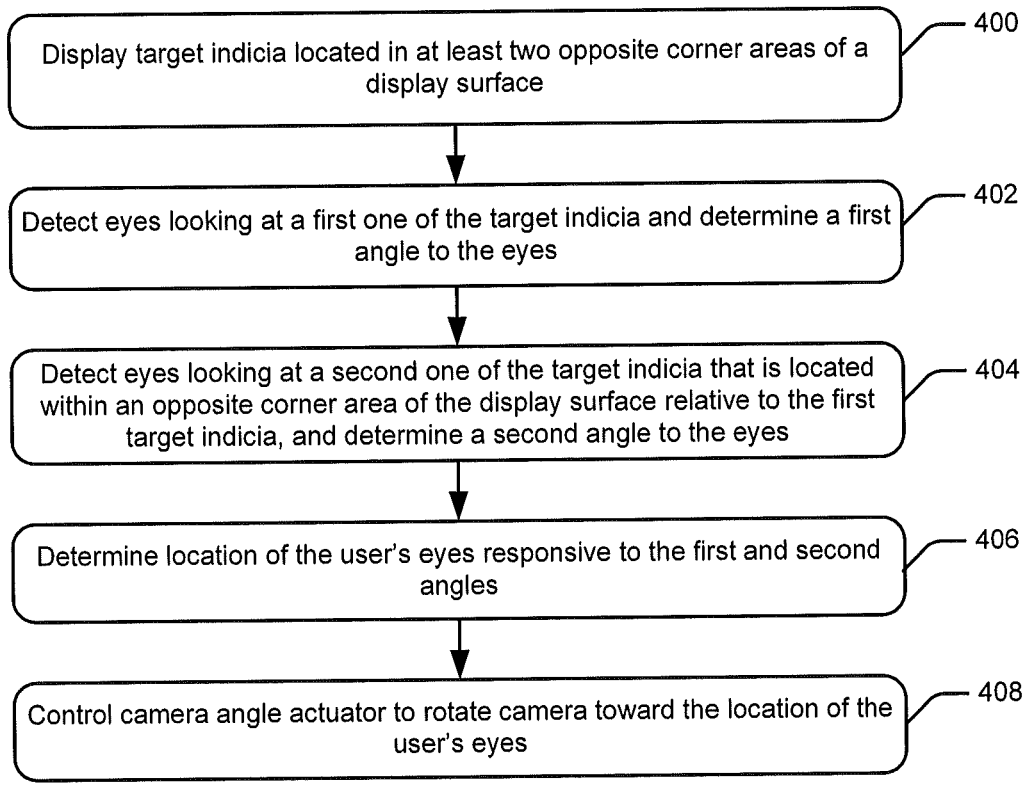

The processor 200 may perform a calibration process to steer the camera 102 toward the user's face, such as the operations and methods shown in the flowchart of FIG. 4. The processor 200 can cause a plurality of target indicia to be displayed (block 400) in at least two opposite corner areas of the display surface 104, and process the video signal from the camera 102 to detect (block 402) when the eyes are looking at a first one of the target indicia, and to responsively determine a first angle to the eyes. The processor 200 can further process the video signal to detect (block 404) when the eyes are looking at a second one of the target indicia that is located within an opposite corner area of the display surface 102 relative to the first target indicia, and to responsively determine a second angle to the eyes. The processor 200 can then determine (block 406) the location of the user's eyes responsive to the first and second angles, and control (block 408) the camera angle actuator 220 to rotate the camera 102 toward the location of the user's eyes.

Controlling Size of User Selectable Indicia:

As explained above, the distance and relative angle between the eyes and display surface 104 can substantially vary due to, for example, height variations between different users and/or tilt angle of a seat back surface (e.g., reclining premium class seating in aircraft). The accuracy at which the SVDU 100 can determine a location on the display surface 104 at which the user is looking, may decrease as the offset distance between the display surface 104 and eyes increases and/or as the tilt angle of the eyes relative to the display surface 104 increases. Consequently, user selectable indicia having a certain dimensional size (e.g., a height value, a width value, and/or a character height and/or width) that may be accurately selected by a user's eyes when the user is of average height and is resting on a non-reclined seat, may become too small to be accurately selected when the user is much taller or shorter than the average height and/or when the user has partially/fully reclined the seat.

Thus, the SVDU 100 can be configured to dynamically resize the user selectable indicia that are displayed on the SVDU 100 responsive to occurrence of one or more defined conditions.

Figure 5:
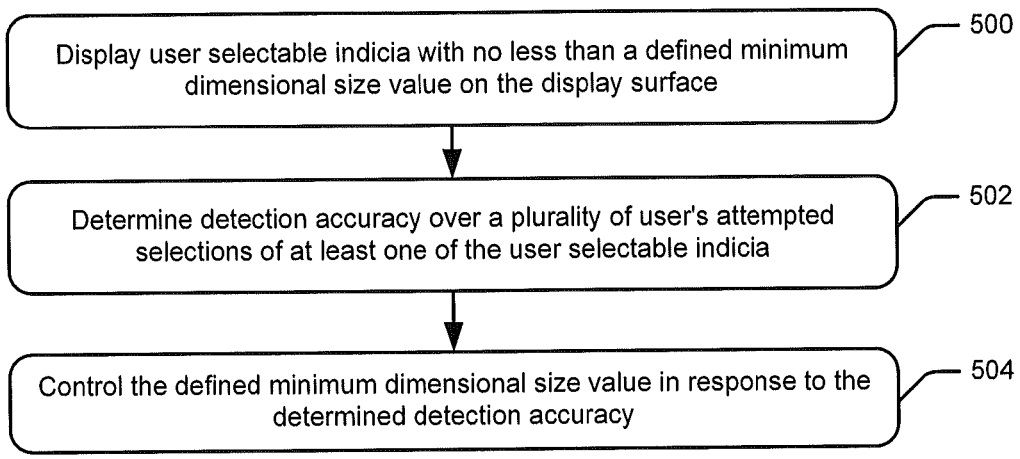
FIGS. 5-8 are flowcharts of operations and methods that may be performed by a processor circuit of the smart video display unit to control size of user selectable indicia on the display device in response to tracking accuracy, angle of recline of a seat back surface, distance to the user's eyes, and/or vibration of the video display unit according to some embodiments.

In one embodiment, the SVDU 100 resizes the displayed user selectable indicia responsive to a determined accuracy of the user's attempted selections. FIG. 5 is a flowchart of related operations and methods that may be performed by the processor 200 to resize the indicia responsive to determined accuracy. The processor 200 can display (block 500) the user selectable indicia with no less than a defined minimum dimensional size value on the display surface 104. The processor 200 can determine (block 502) the detection accuracy over a plurality of the user's attempted selections of at least one of the user selectable indicia. The processor can control (block 504) the defined minimum dimensional size value in response to the determined detection accuracy.

The detection accuracy may be determined based on how often or how many times a user has undone or otherwise canceled a previously determination by the processor 200 of an apparent user's selection of a user selectable indicia, and/or how often the determined location that the user is viewing on the display screen 104 is outside but adjacent to the presently displayed user selectable indicia. The processor 200 can therefore increase the minimum size at which any of the user selectable indicia is displayed when the user is determined to have undone a threshold number of rate of previous determined selections within a threshold length of time and/or when the determined user viewed location appears to be close but not within the area of a user selectable indicia.

Figure 6:
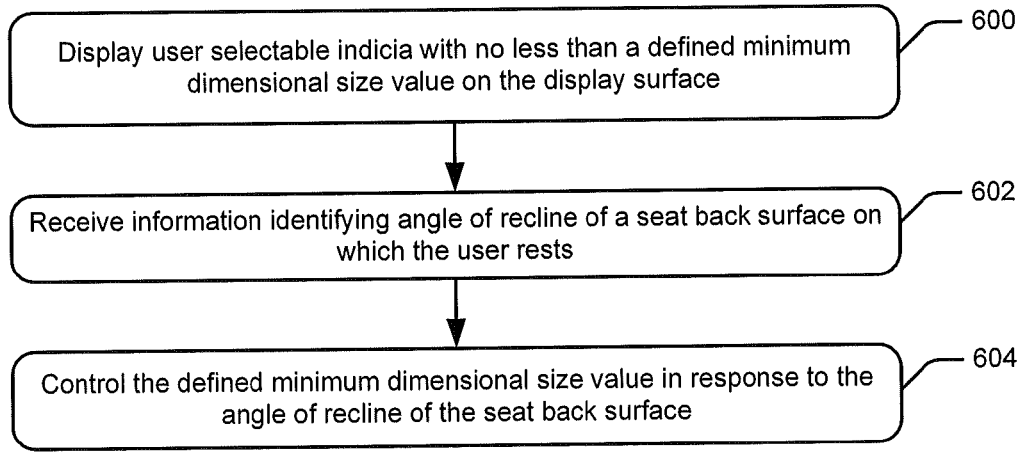

In another embodiment, the SVDU 100 enlarges the minimum size at which any of the user selectable indicia are displayed as the user's seat is reclined, and return the minimum size back to a default value as the user's set is returned to a non-reclined position. FIG. 6 is a flowchart of related operations and methods that may be performed by the processor 200 to resize the indicia responsive to a detected angle of incline of the user's seat. The processor 200 can display (block 600) the user selectable indicia with no less than a defined minimum dimensional size value on the display surface 104. The processor 200 can receive (block 602) information identifying an angle of recline of a seat back surface on which the user rests, and can control (block 604) the defined minimum dimensional size value in response to the angle of recline of the seat back surface.

Another approach that can be used to determine distance to the user's eyes can include, detecting the location of the user's face relative to other background objects such identifiable cabin monuments (e.g., ceiling markings, arm rests, etc.) and/or other users, and identifying relative movement between the user's face and the other background objects.

Another approach that can be used to determine distance to the user's eyes can include a time-of-flight technique. For example, the IR light emitter(s) 110 can emit modulated IR light toward the user, and the processor 200 can determine distance to an object within it field of view using time-of-flight techniques. The time-of-flight technique resolves distance based on the known speed of light, by measuring the round-trip time-of-flight of a light signal between the camera 102 and objects within the field of view of the camera 102. In one embodiment, the light emitter(s) 110 can be pulsed to illuminate the field of view of the camera 102, with the time-of-flight being determined by the processor 200 for reflections from illuminated objects to determine distance to those objects. In another embodiment, a narrow light source (e.g., laser) can be controlled by the processor 200 to scan (e.g., raster scan) the field of view of the camera 102, point-by-point, to detect distances to each of the points. As explained above, one or more of these operations may be performed by a co-processor 280 (FIG. 2).

Figure 7:
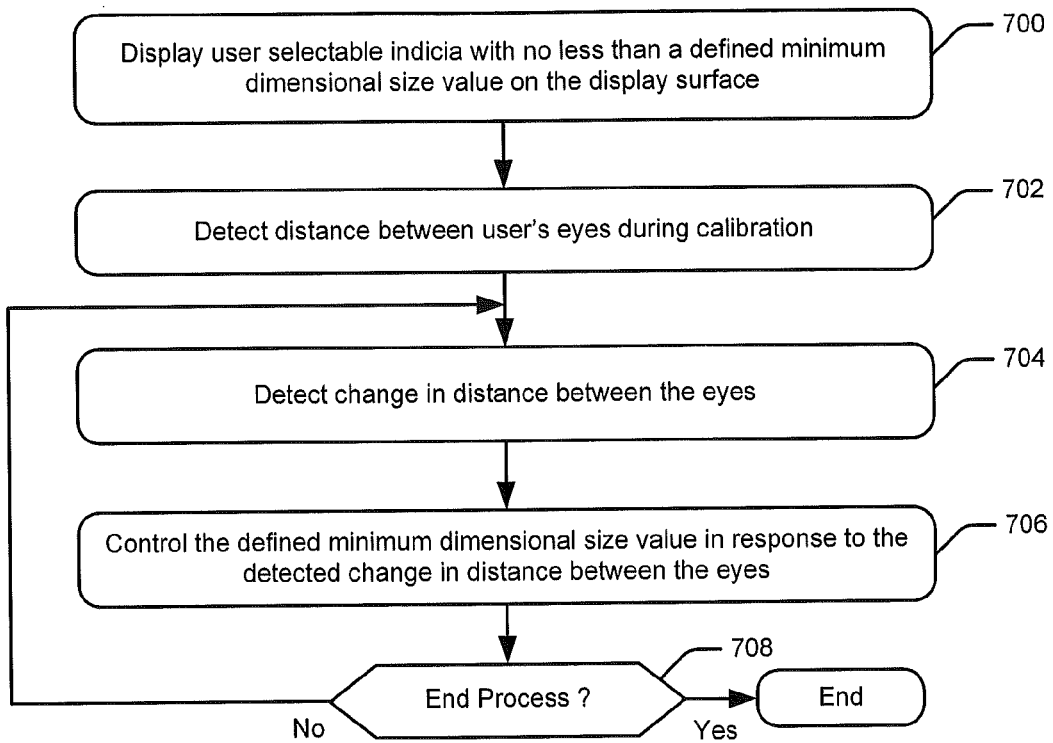

In another embodiment, the SVDU 100 resizes the user selectable indicia responsive to changes in the detected distance between the user's eyes, so as to enlarge the indicia as the user moves further away. FIG. 7 is a flowchart of related operations and methods that may be performed by the processor 200 to resize the indicia. The processor 200 can display (block 700) the user selectable indicia with no less than a defined minimum dimensional size value on the display surface 104. The distance between the user's eyes can be detected (block 702) during a calibration step. The processor 200 can process the video signal to determine (block 704) the distance between the user's eyes, and can control (block 706) the defined minimum dimensional size value in response to the distance between the user's eyes. The indicia can be dynamically controlled responsive to movement of the user's face toward and away from the camera 102 by repeating the operations of blocks 704-706 until a defined end condition is satisfied (block 708).

In an aircraft or other vehicle environment, the user may experience vibration or other turbulence that can cause an extended hand to move relatively uncontrollably. While an aircraft is experiencing turbulence, for example, it may not be possible for a user to look in a steady manner at a menu item on the display 104 that the user wants the processor 200 to select for operation.

Figure 8:
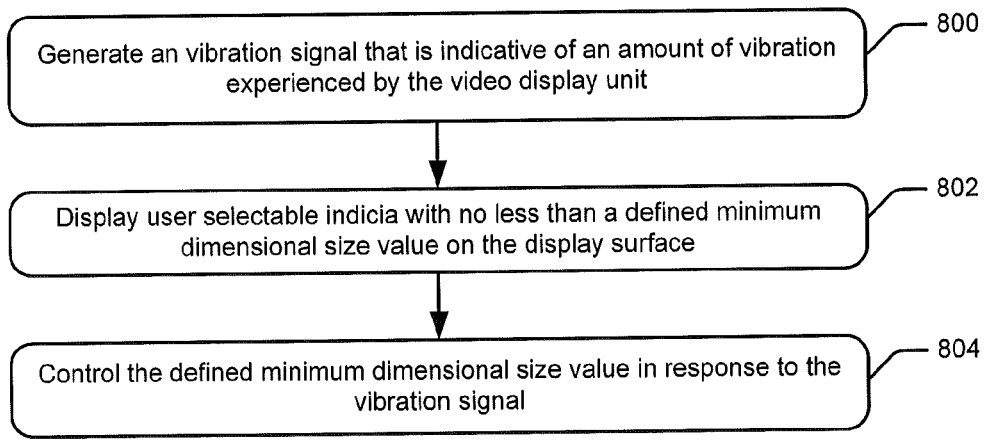

In one embodiment, the SVDU 100 enlarges the minimum size at which any of the user selectable indicia are displayed in response to detecting a threshold amount of vibration of the SVDU 100. Accordingly, when an aircraft is subject to turbulence, the indicia can be enlarged to facilitate the user's selection and reduce the likelihood of erroneous detected selections as the user is moved by the turbulence. FIG. 8 is a flowchart of related operations and methods that may be performed by the processor 200 to resize the indicia responsive to vibration. An acceleration sensor 270 (FIG. 2) can generate (block 800) an acceleration signal that is indicative of an amount of vibration experience by the SVDU 100. The processor 200 can display (block 802) the user selectable indicia with no less than a defined minimum dimensional size value on the display surface 104, while the acceleration signal indicates less than a threshold level of vibration. In contrast, while the acceleration signal indicates more than the threshold vibration, the processor 200 can control (block 804) the defined minimum dimensional size value in response to the vibration signal.

Sequentially Pulses Multiple Light Emitters to Determine Viewing Location

Figure 9:
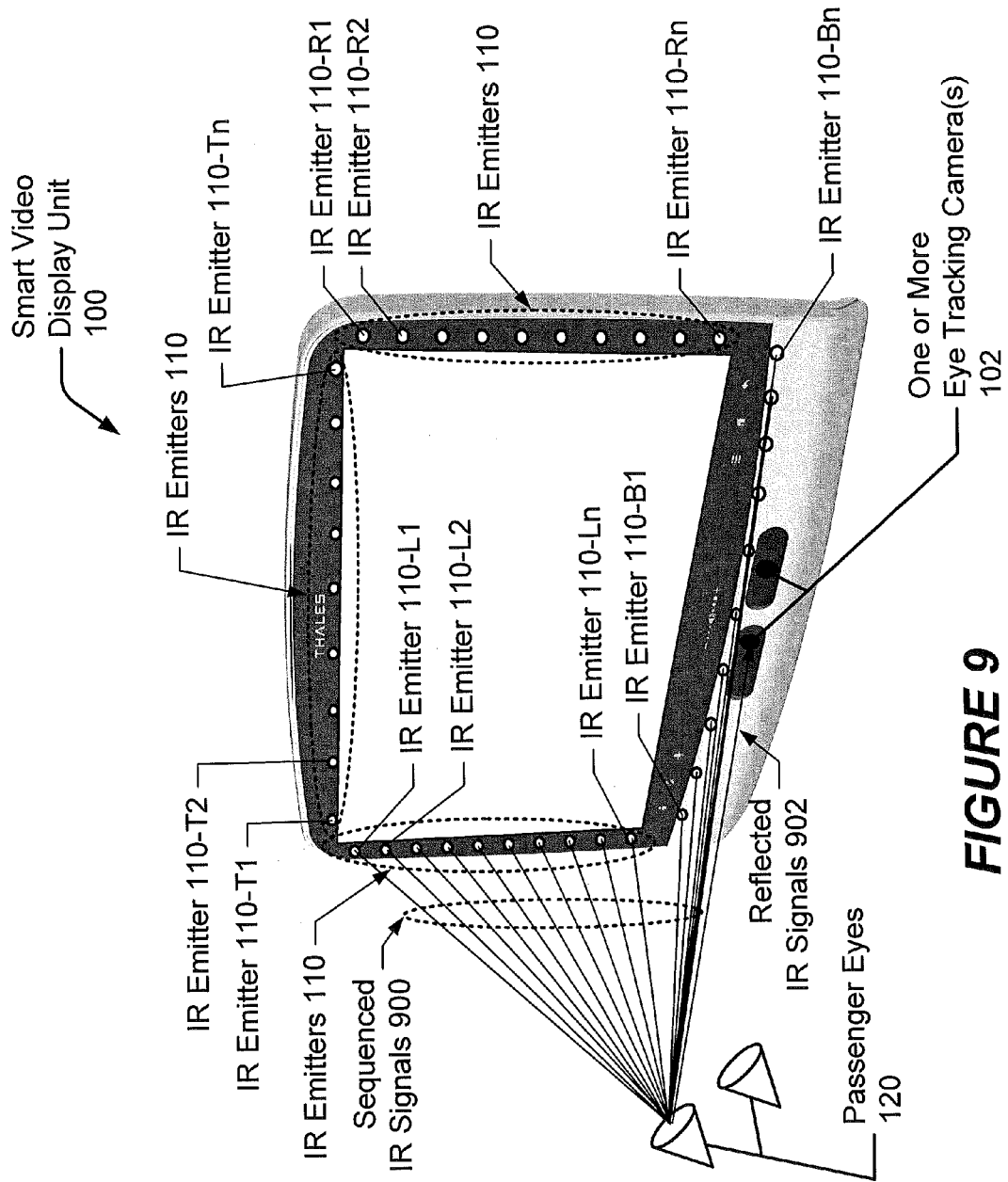
FIG. 9 illustrates another smart video display unit that has an eye control man-machine interface that includes horizontal and vertical arrays of light emitters to determine a user's viewing location according to some embodiments.

Some other embodiments are directed to sequentially pulsing (scanning) one or more arrays of the light emitters 110 to determine the viewing location on the display surface 104 at which the eyes are directed. FIG. 9 illustrates another SVDU 100 that has an eye control man-machine interface that includes horizontal and vertical arrays of light emitters to determine a user's viewing location according to some embodiments. Although a pair of horizontal arrays and a pair of vertical arrays have been illustrated, the operations and methods may instead use a single array of light emitters 110 to determine the user's viewing location, or may use a combination of horizontal arrays to determine the user's viewing location, a combination of vertical arrays to determine the user's viewing location, or a combination of one or more horizontal arrays and one or more vertical arrays to determine the user's viewing location. Moreover, any plural number of light emitters 110 may be included in each of the arrays.

Figure 10:
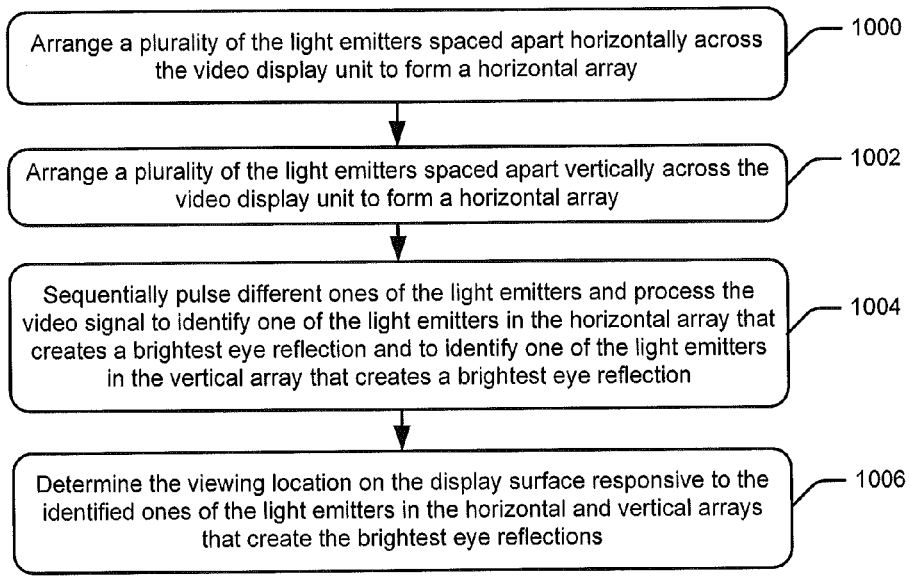
FIGS. 10-12 are flowcharts of operations and methods that may be performed by a processor circuit of the smart video display unit to sequentially pulse the light emitters to identify one of the light emitters in each of the horizontal and vertical arrays that creates a brightest eye reflection to the camera, and to determine the viewing location on the display device responsive to the identified light emitters according to some embodiments.
Figure 11:
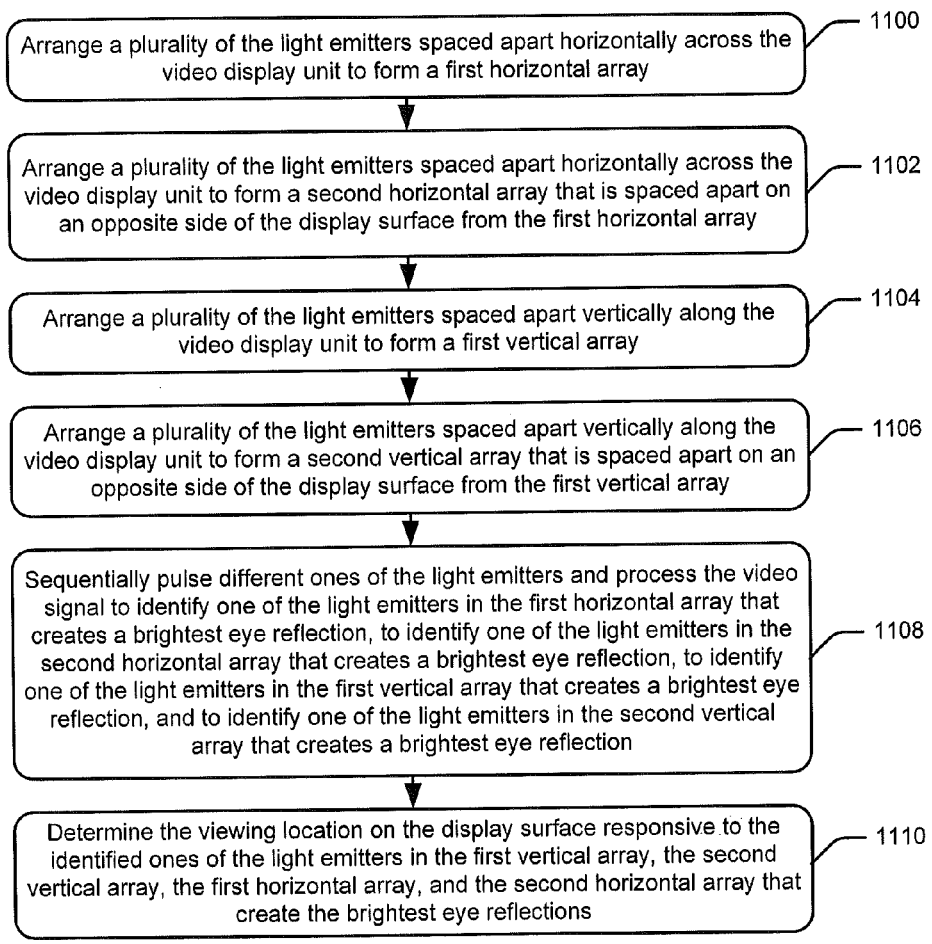

Referring to FIG. 9 and the operations of FIG. 10, a plurality of the IR emitters 110-B1 . . . 110-Bn are spaced apart and arranged horizontally across the SVDU 100 below the display surface 104 to form (block 1000) a bottom horizontal array. Another plurality of the IR emitters 110-L1 . . . 110-Ln are spaced apart and arranged vertically along the SVDU 100 to the left of the display surface 104 form (block 1002) a left vertical array. The processor 200 is configured to sequentially pulse (block 1004) different ones of the IR emitters and to process the video signal to identify one of the light emitters in the bottom horizontal array that creates a brightest eye reflection and to identify one of the IR emitters in the left vertical array that creates a brightest eye reflection, and to determine (block 1006) the viewing location on the display surface 104 responsive to the identified one of the IR emitters in the bottom horizontal array and in the left vertical array that creates the brightest eye reflections.

For example, as shown in FIG. 9, the processor 200 can pulse (turn on and then off) the first IR emitter 110-L1 and process the video signal from the camera 102 to measure the brightness of the reflection from the eyes 120. The processor 200 then pulses (turn on and then off) the second IR emitter 110-L2 and processes the video signal from the camera 102 to measure the brightness of the reflection from the eyes 120. The processor 200 can sequentially repeat the process of pulsing and measuring for the other IR emitters 110-L3 to 110-Ln, and then compare the measurements to identify which of the IR emitters in the left vertical array created the brightest eye reflection. The processor 200 can then perform the sequential pulsing and measurement process with each of the IR emitters 110-B1 to 110-Bn to identify which of the IR emitters in the bottom horizontal array created the brightest eye reflection. The processor 200 can determine the viewing location on the display surface 104 responsive to the identified IR emitters in the bottom horizontal array and the left vertical array that created the brightest eye reflections.

The processor 200 may pulse the IR emitters in any order, and may skip (not pulse) one or more of the IR emitters responsive to determining a location of the eyes relative to the display surface 104 so as to not waste time and processing resources pulse IR emitters that are located too peripheral to the user's eyes to provide a sufficiently useful reflection.

As explained above, any number of vertical and horizontal arrays of the light emitters (e.g., IR emitters) can be used. Referring to the operations and methods of the flowchart of FIG. 11, a plurality of the IR emitters 110-B1 . . . 110-Bn are spaced apart and arranged horizontally across the SVDU 100 below the display surface 104 to form (block 1100) a bottom horizontal array. A plurality of the IR emitters 110-T1 . . . 110-Tn are spaced apart and arranged horizontally across the SVDU 100 above the display surface 104 to form (block 1102) a top horizontal array that is spaced apart on an opposite side of the display surface 104 from the bottom horizontal array.

A plurality of the IR emitters 110-L1 . . . 110-Ln are spaced apart and arranged vertically along the SVDU 100 to the left of the display surface 104 form (block 1104) a left vertical array. A plurality of the IR emitters 110-R1 . . . 110-Rn are spaced apart and arranged across the SVDU 100 to the right of the display surface 104 form (block 1106) a top horizontal array that is spaced apart on an opposite side of the display surface 104 from the bottom horizontal array.

The processor 200 sequentially pulses (block 1408) different ones of the light emitters and processes the video signal to identify one of the light emitters in the bottom horizontal array that creates a brightest eye reflection, to identify one of the light emitters in the top horizontal array that creates a brightest eye reflection, to identify one of the light emitters in the left vertical array that creates a brightest eye reflection, and to identify one of the light emitters in the right vertical array that creates a brightest eye reflection. The processor 200 determines (block 1410) the viewing location of the user's eyes on the display surface 104 responsive to the identified ones of the light emitters in the bottom horizontal array, the top horizontal array, the left vertical array, and the right vertical array that create the brightest eye reflections.

The processor 200 may group varying numbers of the light emitters to pulse at a same time based on how far away the eyes are located. Thus, for example, the processor 200 may simultaneously turn on more lights within a same array as the eyes move further away.

Figure 12:
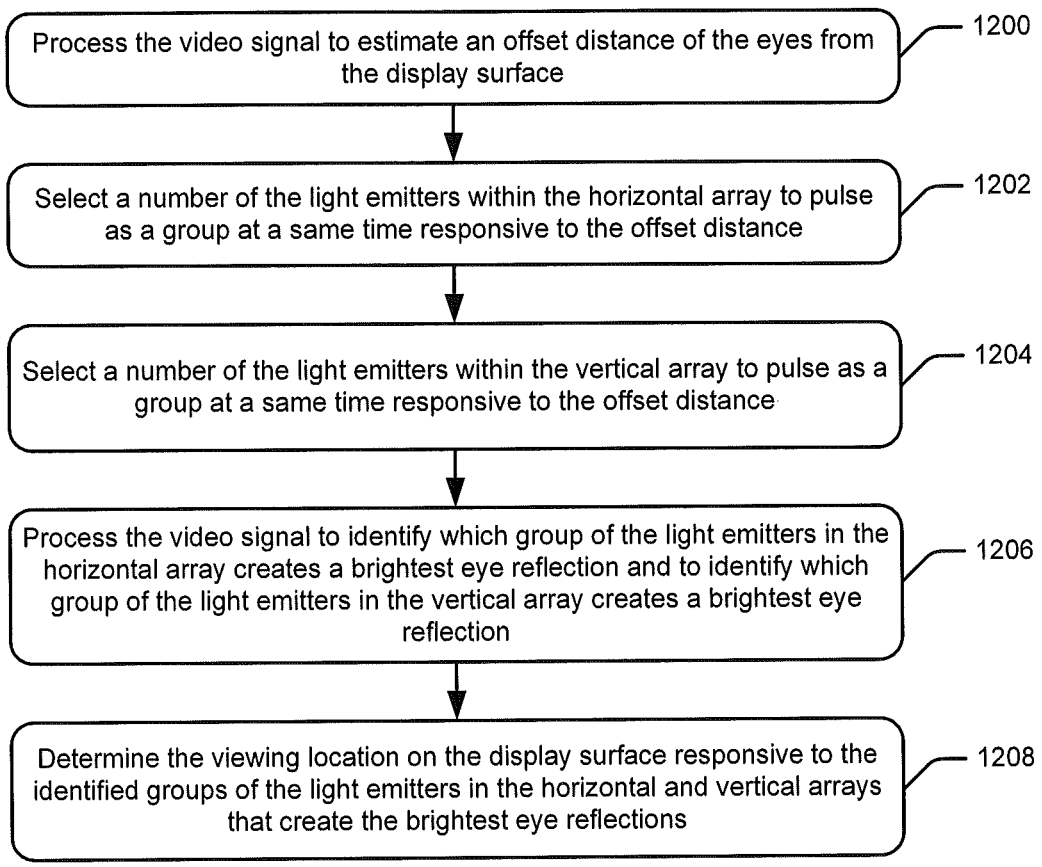

Referring to the example operations and methods of FIG. 12, the processor 200 can process (block 1200) the video signal to estimate an offset distance of the eyes from the display surface 104. The processor 200 selects (block 1202) a number of the light emitters within a horizontal array to pulse as a group at a same time responsive to the offset distance. The processor 200 also selects (block 1204) a number of the light emitters within a vertical array to pulse as a group at a same time responsive to the offset distance. The video signal is processed (block 1206) to identify which group of the light emitters in the horizontal array creates a brightest eye reflection and to identify which group of the light emitters in the vertical array creates a brightest eye reflection. The viewing location on the display surface 104 is determined (block 1208) responsive to the identified groups of the light emitters in the horizontal and vertical arrays that create the brightest eye reflections.

The processor 200 can thereby select a greater number of the light emitters within the horizontal array to pulse as a group at a same time responsive to an increased offset distance, and can select a greater number of the light emitters in the vertical array to pulse as a group at a same time responsive to the increased offset distance. This grouping of light emitters can increase the brightness of the light emitter toward the user's eyes to compensate for increased distances to the eyes.

Controlling the Eye Tracking Space

When the SVDU 100 is used in an aircraft environment and installed in a seatback facing a person, the location of the person's head is limited to a relatively small space between the SVDU 100 and the seat back. Accordingly, certain advantages may be provided by configuring the SVDU 100 to ignore faces and other objects that are located outside that space, to avoid erroneously interpreting as an eye movement any movements by adjacent users, users behind the intended user, a flight attendant attending to adjacent users, and/or movements of users traveling along an adjacent aisle or across an adjacent row.

Spaced Apart Eye Tracking Cameras Tilted Toward Each Other

Figure 13:
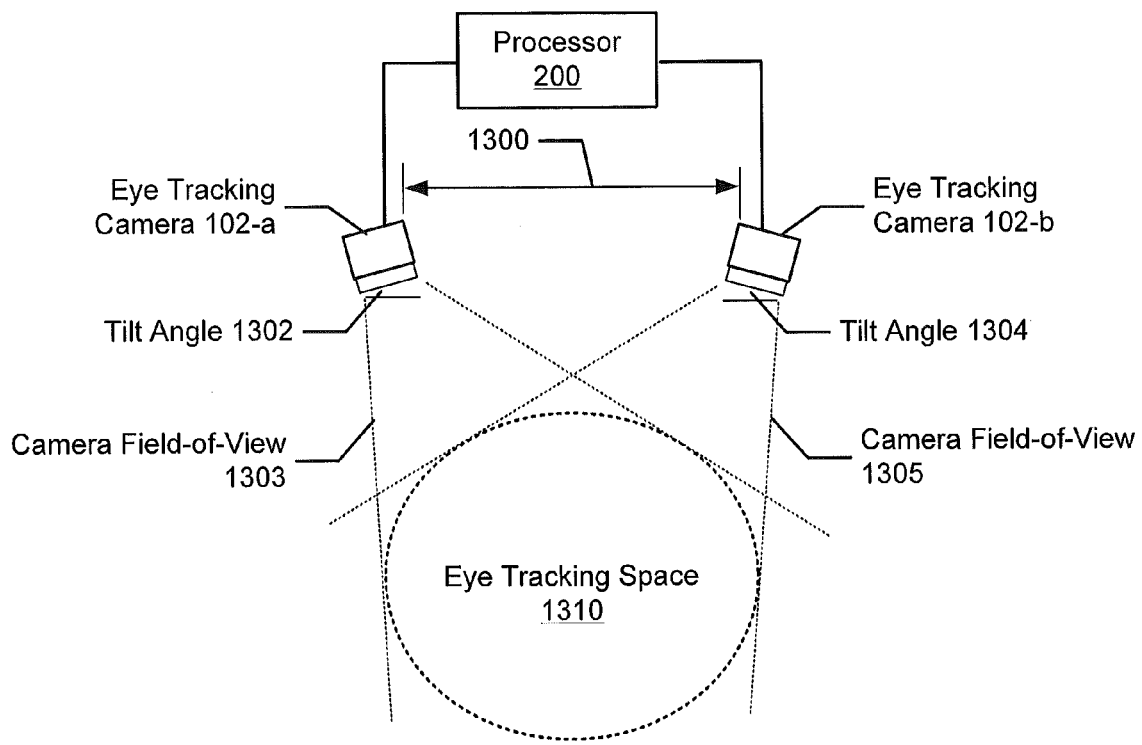
FIG. 13 is a block diagram of a pair of eye tracking control cameras which are tilted toward each other to provide a narrowed overlapping field of view which defines a user eye tracking space according to some embodiments.

FIG. 13 is a block diagram of the cameras 102-a and 102-b which are spaced apart from each other by a distance 1300 across a front face of the SVDU 100. The cameras 102-a and 102-b are tilted toward each other with respective angles 1302 and 1304 to provide a narrowed overlapping field of view, 1303 and 1305 respectively. The processor 200 is connected to receive video images from the cameras 102-a and 102-b, and is configured to identify eye movement within an eye tracking space 1310 that is between the user and the SVDU 100 and defined by the narrowed overlapping field of views of the cameras 102-a and 102-b. When performing operations and methods to identify the viewed locations on the display surface 103, the processor 200 may ignore movement that occurs within the field of view of only one, but not both, of the cameras 102-a and 102-b.

The distance 1300 between the cameras 102-a and 102-b is selected to control a size of the eye tracking space 1310 to be appropriate for use by a user who is seated in front of the SVDU 100 (e.g., when the user is seated at a distance of two to ten feet from the SVDU 100). The distance 1300 is further selected to limit the size of the eye control space 1310 to avoid excessive overlap with other eye control spaces used to control SVDUs at adjacent seats and to ignore movement along any adjacent aisle. Because the cameras 102-a and 102-b are tilted toward each other, the distance 1300 may locate the cameras 102-a and 102-b near opposite sides of the SVDU 100, although other distances between the cameras 102-a and 102-b may be used with the tilt angles 1302 and 1304 being correspondingly adjusted to provide a desired size for the eye control space 1310.

Spaced Apart Eye Tracking Cameras Tilted Away from Each Other

Figure 14:
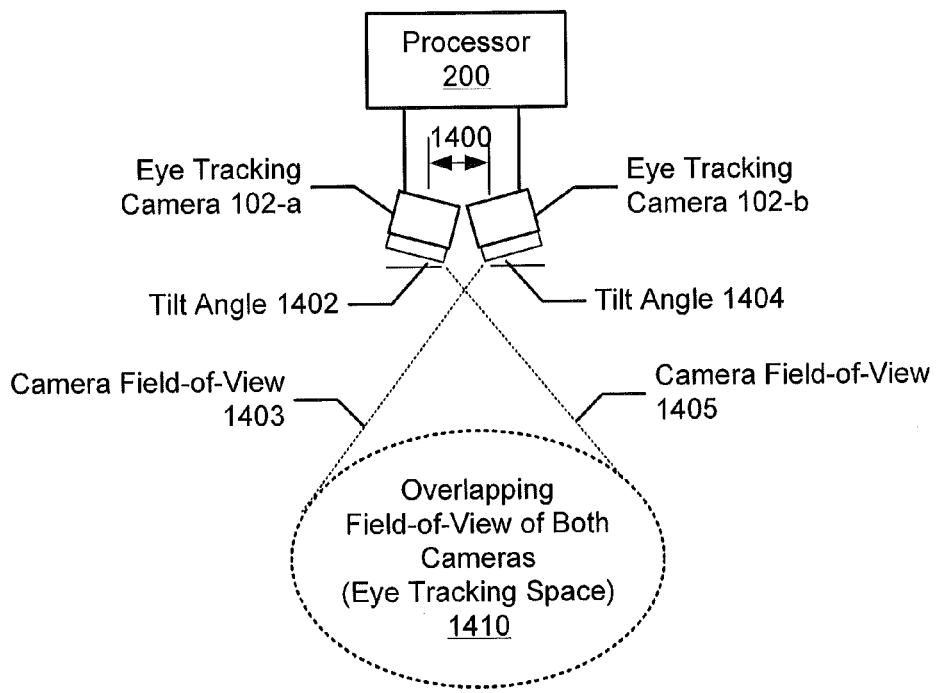
FIG. 14 is a block diagram of a pair of eye tracking control cameras which are closely spaced and tilted away from each other to provide a narrowed overlapping field of view which defines a user eye tracking space according to some embodiments.

FIG. 14 is a block diagram of the pair of cameras 102-a and 102-b which are now closely spaced relative to each other at a distance 1400 across the front face of the SVDU 100. The cameras 102-a and 102-b are tilted away from each other with respective angles 1402 and 1404 to provide a narrowed overlapping field of view 1403 and 1405, respectively. The processor 200 is connected to receive video images from the cameras 102-a and 102-b, and is configured to identify eye movements within an eye tracking space 1410 between the user and the SVDU 100 and defined by the narrowed overlapping field of views of the cameras 102-a and 102-b. When performing operations and methods to identify viewed locations on the display surface 104, the processor 200 may ignore movement that occurs within the field of view of only one, but not both, of the cameras 102-a and 102-b.

The distance 1400 between the cameras 102-a and 102-b is selected to control a size of the space 1410 to be appropriate for use by a user who is seated in front of the SVDU 100, while also limiting the size of the eye tracking space 1410 to avoid excessive overlap with eye tracking spaces used to control SVDUs at adjacent seats and to ignore movement along any adjacent aisle. Because the cameras 102-a and 102-b are tilted away from each other, the distance 1400 should be smaller, and may be much smaller, than the distance 1300 between the cameras 102-a and 102-b of FIG. 13 which are titled toward each other. For example, the distance 1400 may place the cameras 102-a and 102-b immediately adjacent to each other or may space the cameras 102-a and 102-b apart by less than, for example, four inches. Other distances between the cameras 102-a and 102-b may be used with the tilt angles 1402 and 1404 being correspondingly adjusted to provide a desired size for the eye tracking space 1410.

Controlling Depth of Focus of the Eye Tracking Cameras

Figure 15:
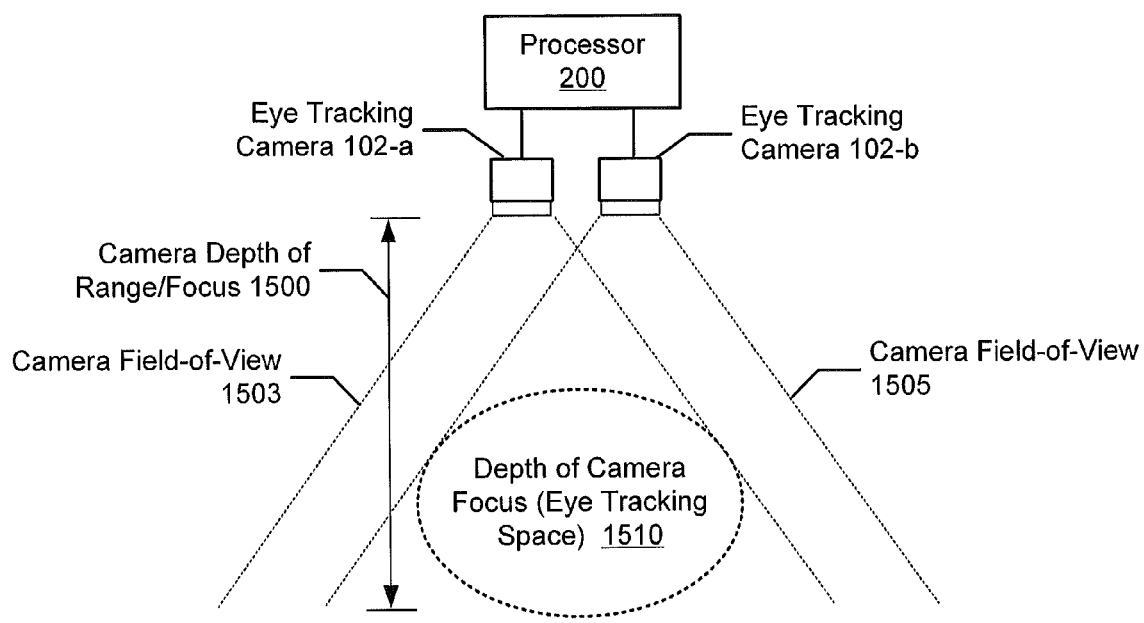
FIG. 15 is a block diagram of a pair of eye tracking control cameras having a restricted depth of focus to provide a user eye tracking space according to some embodiments.

FIG. 15 is a block diagram of a pair of the eye tracking cameras 102-a and 102-b which are position along the front face of the SVDU 100 to provide partially overlapping field of views 1503 and 1505, respectively. The range/depth of focus 1500 of the cameras 102-a and 102-b is controlled to provide a desired size for an eye tracking space 1510. The processor 200 may use the range information obtained by the video signal from the cameras 102-a and 102-b to track objects that are within a threshold distance of the cameras 102-a and 102-b (foreground objects) while ignoring objects beyond that threshold distance (background objects).

In another embodiment, the depth of focus 1500 may be controlled by using one or more lenses on the cameras 102-a and 102-b, or using other techniques, that restrict how far away an object can be positioned while being defined by a threshold level of sharpness (e.g., object edges have a threshold sharpness, edges are not blurred by more than a defined number of pixels, etc) in video images output by the cameras 102-a and 102-b.

The processor 200 is connected to receive video images from the cameras 102-a and 102-b, and is configured to identify eye movement within the eye tracking space 1510 and determine the viewed location on the display surface 104. The eye tracking space 1510 is defined by the overlapping camera field of views 1503 and 1505 and is further defined by a range of in-focus objects within the constrained range/depth of focus 1500 of the cameras 102-a and 102-b. When performing operations and methods to identify the viewed location on the display surface 104, the processor 200 may ignore movement that occurs within the field of view of only one but not both of the cameras 102-a and 102-b, and may further ignore object movement that is beyond a threshold distance of the cameras 102-a and 102-b although being within the field of view of both of the cameras 102-a and 102-b.

Combination of Eye Tracking Control, Gesture Control, Voice Recognition

Although various embodiments are described in the context of using eye tracking to control operation of a SVDU or other defined systems/devices of a vehicle, the eye tracking control may be combined with various other types of control.

For example, eye tracking control can be combined with hand gesture control, whereby the camera(s) 102 and processor(s) 200 and/or 280 can be configured to track movement of a user's eyes and also to track one or more other objects that are moved by the user. The processor(s) 200 and/or 280 can select among a library of known commands responsive to matching the tracked movements to defined movement patterns, etc.

Thus, for example, a user may move one or both hands/fingers to navigate through various menus displayed on the display device 220, and may select a displayed item by staring at the item for at least a threshold time. Alternatively, the user may move the eyes to navigate through various menus displayed on the display device 220, and may select a displayed item by move one or both hands/fingers in a defined manner (e.g., pattern known to the processor(s) 200/280) to confirm the selection.

In a further alternative or additional embodiment, eye tracking control can be combined with voice recognition control, whereby the audio interface 240 can receive a voice signal (e.g., microphone signal) and the processor 200 can be configured to recognize voice commands from the user. The processor 200 can select among a library of known voice commands responsive to pattern matching the user's voice patterns to defined voice patterns in the library that are associated with the respective commands.

Thus, for example, a user may speak various commands to navigate through various menus displayed on the display device 220, and may select a displayed item by staring at the item for at least a threshold time. Alternatively, the user may move the eyes to navigate through various menus displayed on the display device 220, and may select a displayed item by speaking a defined command (e.g., "select", "OK", and/or "Yes") to confirm the selection.

The system may be configured to receive and respond to such eye tracking control, gesture control, and voice control to provide more versatile and natural operation to users. Moreover, users can thereby be provided the added flexibility to choose one or more of the control options based on personal preferences and/or other considerations.

FURTHER EMBODIMENTS AND DEFINITIONS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed:

1. A video display unit comprising:
    a display surface configured to display images to a user;
    a light emitter configured to illuminate eyes of the user while seated in front of the video display unit;
    a camera configured to output a video signal containing reflections from the illuminated eyes;
    a processor configured to process the video signal to determine a viewing location on the display surface at which the eyes are directed, and to control at least one function for how images are displayed on the display surface responsive to the determined viewing location; and
    a camera angle actuator configured to rotate a viewing angle of the camera relative to the display surface,
    wherein the processor is further configured to process the video signal to detect a location of the user's face relative to the camera, and to control the camera angle actuator to rotate the camera toward the user's face to receive reflections from the illuminated eyes.

2. The video display unit of claim 1, wherein the processor is further configured to:
    display target indicia in at least two opposite corner areas of the display surface;
    process the video signal to detect when the eyes are looking at a first one of the target indicia, and to responsively determine a first angle to the eyes;
    process the video signal to detect when the eyes are looking at a second one of the target indicia that is located within an opposite corner area of the display surface relative to the first target indicia, and to responsively determine a second angle to the eyes;
    determine a location of the eyes using the first and second angles; and
    control the camera angle actuator to rotate the camera toward the location of the eyes.

3. A video display unit comprising:
    a display surface configured to display images to a user;
    a light emitter configured to illuminate eyes of the user while seated in front of the video display unit;
    a camera configured to output a video signal containing reflections from the illuminated eyes; and
    a processor configured to:
        process the video signal to determine a viewing location on the display surface at which the eyes are directed,
        display a plurality of user selectable indicia on the display surface, wherein a user's selection of different ones of the user selectable indicia causes the processor to perform a corresponding different function controlling how images are displayed on the display surface;
        detect that the user has selected a first one of the user selectable indicia in response to determining that the viewing location corresponds to a location of the first user selectable indicia for at least a threshold selection dwell time
        display the user selectable indicia with no less than a defined minimum dimensional size value on the display surface;
        determine detection accuracy over a plurality of user's attempted selections of at least one of the user selectable indicia; and
        control the defined minimum dimensional size value of the user selectable indicia displayed on the display surface in response to the determined detection accuracy.

4. The video display unit of claim 3, wherein the processor is further configured to:
    detect that the user has selected the first one of the user selectable indicia in response to further determining, from processing of the video signal, that the user's eyes remained closed while blinking for at least a threshold blink time while the previously determined viewing location corresponds to the location of the first user selectable indicia.

5. The video display unit of claim 3, wherein the processor is further configured to:
    receive information identifying an angle of recline of a seat back surface on which the user rests; and
    control the defined minimum dimensional size value in response to the angle of recline of the seat back surface.

6. The video display unit of claim 3, wherein the processor is further configured to:
    display the user selectable indicia with no less than a defined minimum dimensional size value on the display surface;
    process the video signal to determine distance between the user's eyes; and
    control the defined minimum dimensional size value in response to the distance between the user's eyes.

7. A video display unit comprising:
    a display surface configured to display images to a user;
    a light emitter configured to illuminate eyes of the user while seated in front of the video display unit;
    a camera configured to output a video signal containing reflections from the illuminated eyes;
    an acceleration sensor that generates a vibration signal that is indicative of an amount of vibration experienced by the display surface, wherein the video display unit is part of an in-flight entertainment system and the display surface is attached to a back surface of a user seat to display images to a user who is seated on another user seat facing the user seat; and
    a processor configured to:
        process the video signal to determine a viewing location on the display surface at which the eyes are directed,
        display a plurality of user selectable indicia on the display surface, wherein a user's selection of different ones of the user selectable indicia causes the processor to perform a corresponding different function controlling how images are displayed on the display surface;
        detect that the user has selected a first one of the user selectable indicia in response to determining that the viewing location corresponds to a location of the first user selectable indicia for at least a threshold selection dwell time;

display the plurality of user selectable indicia with no less than a defined minimum dimensional size value on the display surface; and enlarge the defined minimum dimensional size of the plurality of user selectable indicia concurrently displayed on the display surface from a first value to a second value in response to detecting a threshold amount of vibration indicated by the vibration signal.

8. A video display unit comprising:

a display surface configured to display images to a user;

a light emitter configured to illuminate eyes of the user while seated in front of the video display unit;

a camera configured to output a video signal containing reflections from the illuminated eyes;

a processor configured to process the video signal to determine a viewing location on the display surface at which the eyes are directed, and to control at least one function for how images are displayed on the display surface responsive to the determined viewing location;

a plurality of the light emitters spaced apart and arranged horizontally across the video display unit to form a horizontal array; and a plurality of the light emitters spaced apart and arranged vertically along the video display unit to form a vertical array, wherein the processor is further configured to sequentially pulse different ones of the light emitters and to process the video signal to identify one of the light emitters in the horizontal array that creates a brightest eye reflection and to identify one of the light emitters in the vertical array that creates a brightest eye reflection, and to determine the viewing location on the display surface responsive to the identified ones of the light emitters in the horizontal and vertical arrays that create the brightest eye reflections.

9. The video display unit of claim 8, wherein:

the horizontal array of the light emitters is arranged adjacent to a bottom surface of the display area; and the vertical array of the light emitters is arranged adjacent to a side surface of the display area.

10. The video display unit of claim 8, wherein the horizontal array comprises a first horizontal array, and the vertical array comprises a first vertical array, and further comprising:

a plurality of the light emitters spaced apart and arranged horizontally across the video display unit to form a second horizontal array that is spaced apart on an opposite side of the display surface from the first horizontal array; and a plurality of the light emitters spaced apart and arranged vertically along the video display unit to form a second vertical array that is spaced apart on an opposite side of the display surface from the first vertical array, wherein the processor is further configured to sequentially pulse different ones of the light emitters and process the video signal to identify one of the light emitters in the first horizontal array that creates a brightest eye reflection, to identify one of the light emitters in the second horizontal array that creates a brightest eye reflection, to identify one of the light emitters in the first vertical array that creates a brightest eye reflection, to identify one of the light emitters in the second vertical array that creates a brightest eye reflection, and to determine the viewing location on the display surface responsive to the identified ones of the light emitters in the first horizontal array, the second horizontal array, the first vertical array, and the second vertical array that create the brightest eye reflections.

11. The video display unit of claim 8, wherein:

the processor is further configured to process the video signal to estimate an offset distance of the eyes from the display surface, and to further determine the viewing location on the display surface responsive to the offset distance.

12. The video display unit of claim 8, wherein the processor is further configured to:

process the video signal to estimate an offset distance of the eyes from the display surface;

select a number of the light emitters within the horizontal array to pulse as a group at a same time responsive to the offset distance;

select a number of the light emitters within the vertical array to pulse as a group at a same time responsive to the offset distance; and process the video signal to identify which group of the light emitters in the horizontal array creates a brightest eye reflection and to identify which group of the light emitters in the vertical array creates a brightest eye reflection, and to determine the viewing location on the display surface responsive to the identified groups of the light emitters in the horizontal and vertical arrays that create the brightest eye reflections.

13. The video display unit of claim 12, wherein:

the processor is further configured to select a greater number of the light emitters within the horizontal array to pulse as a group at a same time responsive to an increased offset distance, and to select a greater number of the light emitters in the vertical array to pulse as a group at a same time responsive to the increased offset distance.

14. The video display unit of claim 8, wherein:

the processor is further configured to display a prompt to the user seated on a user seat within an aircraft to turn-off overhead lighting and/or to close a side window blind responsive to the processor detecting more than a threshold level of lighting in the video signal which interferes with the determination of the viewing location on the display surface.

15. The video display unit of claim 1, wherein:

the video display unit is part of an in-flight entertainment system and the video display unit is attached to a back surface of a user seat with the display surface to display images to a user who is seated on another user seat facing the user seat.

16. The video display unit of claim 3, wherein:

the video display unit is part of an in-flight entertainment system and the video display unit is attached to a back surface of a user seat with the display surface to display images to a user who is seated on another user seat facing the user seat.

17. The video display unit of claim 7, wherein subsequent to enlarging the defined minimum dimensional size value of the plurality of user selectable indicia concurrently displayed on the display surface from a first value to a second value in response to detecting the threshold amount of vibration indicated by the vibration signal, the processor is further configured to:

return the defined minimum dimensional size value of the plurality of user selectable indicia concurrently displayed on the display surface back to the first value in response to detecting less than the threshold amount of vibration indicated by the vibration signal.

18. The video display unit of claim 8, wherein:
the video display unit is part of an in-flight entertainment system and the video display unit is attached to a back surface of a user seat with the display surface to display images to a user who is seated on another user seat facing the user seat.

* * * * *

UNITED STATES PATENT AND TRADEMARK OFFICE
CERTIFICATE OF CORRECTION

PATENT NO. : 8,928,585 B2
APPLICATION NO. : 13/605176
DATED : January 6, 2015
INVENTOR(S) : Mondragon et al.

Page 1 of 1

It is certified that error appears in the above-identified patent and that said Letters Patent is hereby corrected as shown below:

In the Claims:
Column 19, Claim 7, Line 5: Please correct "size value on"
to read -- size on --

Signed and Sealed this
Thirtieth Day of June, 2015

Michelle K. Lee
*Director of the United States Patent and Trademark Office*